United States Patent [19]

Wynn

[11] Patent Number: 4,587,111
[45] Date of Patent: May 6, 1986

[54] METHOD OF LIQUID-LIQUID EXTRACTION OF GALLIUM FROM A BASIC AQUEOUS SOLUTION

[75] Inventor: Nicholas P. Wynn, Toronto, Canada

[73] Assignee: Sulzer Brothers Limited, Winterthur, Switzerland

[21] Appl. No.: 669,065

[22] Filed: Nov. 7, 1984

[30] Foreign Application Priority Data

Nov. 17, 1983 [CH] Switzerland .................. 6178/83

[51] Int. Cl.$^4$ .................................... C01G 15/00
[52] U.S. Cl. ................................ 423/112; 423/119; 423/624; 423/181; 75/101 BE; 75/121
[58] Field of Search .................. 75/101 BE, 121; 423/112, 119, 624, 181

[56] References Cited

U.S. PATENT DOCUMENTS

| 3,971,843 | 7/1976 | Helgorsky et al. | 423/112 |
| 4,169,130 | 9/1979 | Helgorsky et al. | 423/112 |
| 4,241,029 | 12/1980 | Helgorsky et al. | 423/112 |
| 4,369,166 | 1/1983 | Leveque et al. | 423/112 |
| 4,404,174 | 9/1983 | Leveque et al. | 423/112 |
| 4,485,076 | 11/1984 | Bauer et al. | 423/112 |

Primary Examiner—John Doll
Assistant Examiner—Robert L. Stoll
Attorney, Agent, or Firm—Kenyon & Kenyon

[57] ABSTRACT

The process of liquid-liquid extraction of gallium from sodium aluminate liquor used in the Bayer alumina process, uses an organic extractant comprising a diluent and a substituted hydroxyquinoline such that gallium and some aluminum are extracted into the organic phase.

In five successive steps, the organic extractant solution loaded with gallium and aluminum is first contacted with an aqueous mineral acid solution, during which the acid solution strips the loaded solution of gallium and aluminum. Next, the phases are separated and a chloride salt or hydrochloric acid is dissolved in the acidic solution of gallium and aluminum which is then contacted with an organic solvent, e.g. n-butyl acetate. Aluminum remains in the aqueous acid solution whereas the organic solvent becomes loaded with gallium.

After the phases have been separated, the organic solvent is separated from gallium chloride, which forms the feed for producing pure gallium.

10 Claims, 1 Drawing Figure

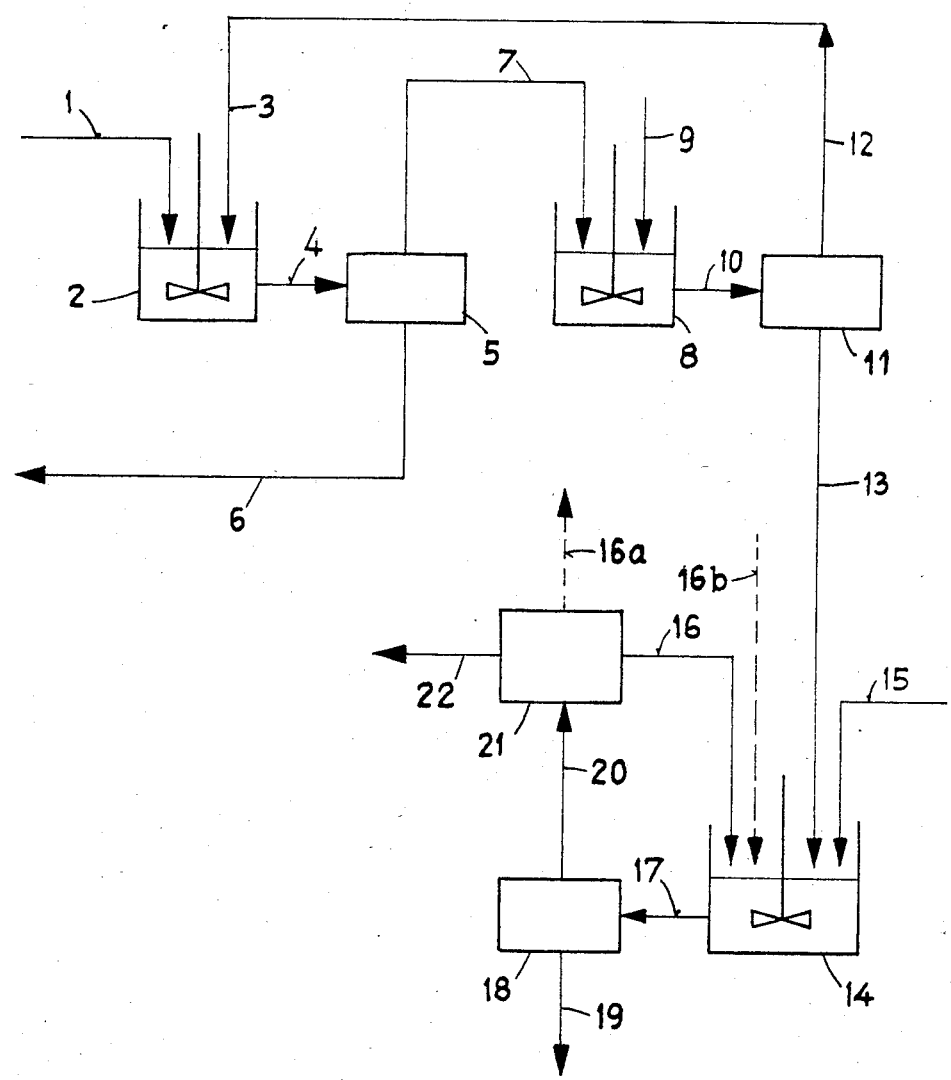

METHOD OF LIQUID-LIQUID EXTRACTION OF GALLIUM FROM A BASIC AQUEOUS SOLUTION

This invention relates to a process for liquid-liquid extraction of gallium from a basic aqueous solution, more particularly from a sodium aluminate liquor used in the Bayer process for alumina production.

In the known Bayer process, which is used for producing aluminum oxide from aluminum minerals (bauxites), the aluminum minerals are decomposed with caustic soda solution at elevated temperature and pressure. The aluminum hydroxide can then be precipitated from the sodium aluminate liquor and subsequently burnt or calcined to $Al_2O_3$ (alumina).

Most gallium recovered today is obtained from these sodium aluminate liquors. In the Bayer process, a typical bauxite feed will contain around 0.01% gallium, i.e. a gallium to aluminum ratio of around 1:4000. However, since aluminum is more easily precipitated from sodium aluminate liquor, the effect of recycling the liquor to leach more bauxite is to increase the gallium to aluminum ratio to a value nearer 1:300.

A common but expensive method of recovering gallium is to treat the sodium aluminate liquor in an electrolytic cell with a mercury cathode.

Organic substances have also been used to extract gallium from the basic solutions used, for example, in the Bayer process. The first organic extractants disclosed were hydroxyquinoline and acetyl acetone as metioned, for example, in French Pat. No. 952 976 and U.S. Pat. No. 3,887,681. However, their high solubility in the basic liquor and their low selectivity are obstacles to their industrial use.

The development and introduction of copper-specific extractants based on hydroxyquinoline initially led to expensive research on the industrial use of these substituted hydroxyquinolines, more particularly substituted 8-hydroxyquinoline, for extracting gallium from the liquors in the Bayer process. Although these organic extractants have relatively high selectivity for gallium as against aluminum, it is still impossible to extract gallium from an aluminate liquor in the Bayer process without also extracting an approximately similar or larger quantity of aluminum. Usually, the ratio of aluminum to gallium in the aluminate liquor in the Bayer process is about 300:1, with the result that the ratio of aluminum to gallium in the loaded extractant is between 5:1 to 15:1. Consequently, simple acid stripping of the loaded extractant does not yield pure gallium, but a product consisting mostly of aluminum.

U.S. Pat. No. 3,971,843 describes a process in which the above problem is solved by selectively stripping aluminum from the loaded extractant.

If the gallium and aluminum loaded extractant is first brought in contact with a dilute inorganic acid, e.g. 100 g/l sulphuric acid, it is possible to remove aluminum from the extractant solution. A more highly concentrated acid can then be used to remove almost pure gallium from the extractant solution. However, this two-stage method of stripping aluminum and gallium has serious disadvantages due to the relatively low loading capacity of the extractant solution for gallium.

If substituted hydroxyquinolines are used as extractant, it is conventional in practice to dissolve them in an organic diluent, usually refined kerosene. These solutions have relatively low viscosity and can therefore easily be contacted with aqueous solutions of sodium aluminate and inorganic acids to obtain relatively rapid mass transfer.

In addition, the density of these solutions is nearer that of the solvent than of the extractant. For this reason, the phases can be very effectively separated by gravity after being brought into contact with one another.

To make optimum use of the aforementioned properties, it is conventional to use extractant solutions containing between 5 and 10 and not more than 15% by weight of the extractant.

Under these circumstances, the loading of the extractant solution with gallium is relatively low, certainly below 1 g/l and more likely about 200–300 mg/l. For this reason, relatively large quantities of extractant solution are required for the extraction of gallium.

In the first embodiment of the two-stage method of stripping metals disclosed in the aforementioned U.S. Pat. No. 3,791,843, the large amount of extractant solution required, loaded only with about 300 mg/l gallium, is first brought into contact with a dilute acid to strip the aluminum. Next, the extractant solution is brought in contact with a more highly concentrated acid to strip the gallium, which is then separated as the product.

Due to the low concentration of metals in the extractant solution, a plant for carrying out the process is expensive with regard to the dimensions of the individual components. Also, separate steps are needed for separating aluminum and gallium from the extractant solution. The process is therefore very expensive.

Substituted hydroxyquinoline as an extractant is expensive compared with the hydroxyoximes more commonly used for copper extraction. The cost of hydroxyquinoline is an important item in a gallium extraction plant.

U.S. Pat. No. 3,971,843 also proposes a process for selective stripping of gallium and aluminum using hydrochloric or bromic acid. In the process, aluminum is first stripped from the loaded extractant solution, using more highly concentrated acid. The acid concentration is chosen so that anionic gallium complexes are formed and remain in the extractant solution. The aluminum-free solution is then brought in contact with a more weakly-concentrated acid solution to obtain relatively pure gallium.

Although this process gives somewhat better separation than the previously-mentioned process, the process has the same disadvantages, since an expensive extractant is involved in separating gallium from aluminum in dilute solutions.

Another serious disadvantage is that the anionic complexes required for retaining gallium in the extractant solution while aluminum is being separated, are formed most economically if hydrochloric acid is used as the stripping agent for aluminum.

This acid corrodes not only carbon steel but also austenitic stainless steel. Only nickel alloys, e.g. those sold under the trade name "Hastelloy", are sufficiently resistant to concentrated hydrochloric acid for use in industrial installations. These metals, however, are very expensive due to their high nickel content.

Some plastics or elastomeric materials are resistant to hydrochloric acid, but most of these substances do not have prolonged resistance to the organic diluents used for the extractant. This particularly applies when aromatic substances are used. The use of these diluents is often advantageous because of their high capacity for dissolving the various metal complexes formed during the process.

However, the few plastics (e.g. phenolic resins) which are resistant both to hydrochloric acid and organic solvents, have serious disadvantages in that they can become electrostatically charged and consequently the entire system is exposed to the risk of fire or explosion. For these reasons, hydrochloric acid is preferably not used in solvent extraction processes, particularly when only low metal loadings can be achieved in the organic extractant solution. In such cases, the use of sulphuric acid is preferred, since this acid is non-corrosive towards a large number of stainless steels which are not particularly expensive.

Accordingly, it is an object of the invention to devise a method of recovering gallium from a basic organic solution using a minimum of substituted hydroxyquinoline.

It is another object of the invention to provide a method of recovering gallium which can be carried out in relatively small plants.

Briefly, the invention provides a process of liquid-liquid extraction of gallium from a basic aqueous solution. Initially, the method brings a basic aqueous solution such as a sodium aluminate solution and an organic extractant including a diluent and a substituted hydroxyquinoline into contact in order to load the extractant solution with gallium and aluminum. This solution is then subjected to a sequence of five steps.

In a first step, the loaded extractant is contacted with concentrated aqueous mineral acid in order to strip gallium and aluminum.

In the next step, the aqueous phase, containing dissolved gallium and aluminum is separated from the depleted extractant solution.

Next, the chloride content of the resulting aqueous phase is increased to a concentration of more than two mols per liter. In this third step, the acidic solution of aluminum and gallium is then brought into contact with an organic solvent selected from the group consisting of ethyl ethers containing between 2 and 16 carbon atoms or alkyl acetates containing less than 10 carbon atoms in order to pass gallium chloride into the organic solvent while aluminum remains in the concentrated mineral acid.

In a fourth step, the mineral acid with dissolved aluminum is separated from the gallium chloride loaded solvent.

Thereafter, in a fifth step, the organic solvent is separated from the gallium chloride so that the separated gallium chloride is then available for producing pure gallium.

As compared with the known processes (mentioned above), the method of the invention has the following main advantages.

After the organic extractant solution has been brought into contact for example in a single stirred tank with a concentrated aqueous mineral acid, e.g. sulphuric acid, the extractant solution can be separated from both gallium and aluminum in a single separator, e.g. a gravity settler, and recycled to the extraction stage.

Since the organic extractant solution is stripped simultaneously of gallium and aluminum, the amount and concentration of the concentrated aqueous mineral acid does not need to be so accurately adjusted as in the known selective separation of gallium from aluminum.

As is known, it is difficult to adjust the amount and concentration of acid or acids exactly.

Another important advantage is that, in the third step, the aqueous concentrated mineral acid containing gallium and aluminum can be contacted with an organic solvent, which is much cheaper and can also be more highly loaded with gallium than substituted hydroxyquinoline. Also, an aqueous solution of gallium and aluminum can contain much more gallium than in the case of a hydroxyquinoline extractant solution. As a result, a much smaller stirred tank can be used in the third step than that in the first step.

Also, the phase separation in the fourth step can be accomplisehd in a small settling tank. The same applies to the equipment size for the fifth step.

An overall view of the process steps proposed will clearly show that, in addition to the advantages outlined above, the amount of expensive substituted hydroxyquinoline required is much less than in the known processes.

These and other objectives and advantages of the invention will become more apparent from the following detailed description taken in conjunction with the accompanying drawing wherein:

The FIGURE illustrates the flow diagram of a plant for carrying out the process of the invention.

Referring to the drawing, the components of the plant are all of known construction and are shown diagramatically.

The plant is constructed to carry out the process of liquid-liquid extraction of gallium from a basic aqueous solution, for example, a sodium aluminate solution.

As indicated, a side stream of sodium aluminate solution containing gallium and aluminum is supplied through a line 1 to a stirred tank 2 and is contacted with an organic extractant solution supplied through a line 3 and comprising a diluent and a substituted hydroxyquinoline.

In the process, the organic extractant solution is loaded in a known manner with gallium and a quantity of aluminum.

The resulting mixture is then supplied through line 4 to a settling tank 5 and separated by gravity into a liquor depleted in gallium and an organic extractant solution loaded with gallium and aluminum. The depleted liquor is recycled through line 6 to the alumina production process, whereas the organic extractant solution loaded with gallium and aluminum is supplied through line 7 to a stirred tank 8 and contacted with an aqueous concentrated mineral acid, e.g. sulphuric acid, supplied through line 9. In the process, the aqueous concentrated mineral acid strips both gallium and aluminum from the organic extractant solution.

The resulting mixture is then fed through a line 10 to a separator, perferably another settling tank 11, and separated into a lighter and a heavier phase (second step). The separated lighter organic extractant solution, depleted of gallium and aluminum, is then removed from the tank 11 through line 12 and recycled through a connecting line 3 to the tank 2. The organic extractant solution thus flows in a closed circuit and the losses and make-up required, e.g. through imperfect phase separation, are very small.

The heavier aqueous concentrated acid containing gallium and aluminum is fed from tank 11 through line 13 to a stirred tank 14. Here, the chloride content of the acidic solution is increased. To this end, a chloride salt such as an alkali metal chloride or hydrochloric acid is added through a line 15 so that the aqueous acidic solution of gallium and aluminum is brought to a concentration of more than 2 mols per liter chloride. In addition, an organic solvent, e.g. n-butyl acetate, is supplied through a line 16 to the tank 14. As a result of contacting the acidic solution containing gallium and aluminum, the solvent becomes loaded with gallium in the form of gallium chloride whereas aluminum remains in the aqueous phase (third step).

The resulting mixture is then fed through line 17 to a separator 18, which again can be a settling tank. In tank 18, the lighter phase, i.e. the gallium chloride loaded solvent, is separated from the heavier phase, i.e. the acidic solution of aluminum by gravity (fourth step).

The acidic soluation of aluminum is removed from the separator 18 through a line 19 whereas the organic solvent charged with gallium chloride is fed through line 20 to a separator 21. The gallium chloride is then separated from the organic solvent in unit 21 (fifth step).

The separation process can be e.g. as follows. The organic solvent is evaporated and gallium chloride is removed from the separator 21 through a line 22. The gallium chloride forms the starting feed for obtaining gallium in known manner. The evaporated organic solvent is then condensed and recycled through the line 16 into the tank 14. The organic solvent can be separated from gallium chloride in a different way, e.g. by contacting the loaded organic solvent with water or a dilute solution of a mineral acid to transfer the gallium chloride into the water or aqueous phase and thereafter separating the organic solvent from the water or aqueous phase.

Since the organic solvent is cheaper than substituted hydroxyquinoline, the solvent separated e.g. in the separator 21 may alternatively be removed from the separator 21 through a line 16a and dumped with fresh organic solvent being supplied to the tank 14 through another line 16b.

As already mentioned, the tank 14 and separators 18, 21 are much smaller than the tank 2, 8 and separators 5, 11.

The organic solvent which is used in the stirred tank 14 may be selected from a group consisting of ethyl ethers containing between 2 and 16 carbon atoms or alkyl acetates containing less than 10 carbon atoms.

Some experimentally determined quantitative data for a process which can be run in the plant will now be diven in a numerical example.

NUMERICAL EXAMPLE 10 litres of a sodium aluminate solution from a Bayer process containing 150 mg/l Ga, 71 g/l $Al_2O_3$ and 125 g/l $Na_2O$ were contacted with 5 litres of an organic extractant solution.

The organic extractant solution comprised 15% by volume of substituted 8-hydroxyquinoline, 15% of isodecanol and 70% Shellsol K (registered trade mark).

After the subsequent separation of the two phases, the gallium content was 215 mg/l and the aluminum content was 1.58 g/l as measured in the organic extractant solution.

The organic extractant solution loaded with gallium and aluminum was then contacted with 50 ml of an aqueous solution containing 600 g/l sulphuric acid.

After the subsequent separation of the two phases, 270 ml of aqueous sulphuric acid solution was found to contain 92% of the gallium previously in the organic extractant solution.

Next, 47 g of sodium chloride were dissolved in the 270 ml of aqueous sulphuric acid solution and contacted with 30 ml of n-butyl acetate.

After the aqueous phase had been separated from the organic phase, the organic phase was stripped with steam. 11 ml of solution remained after stripping and contained 76.5 g/l gallium and 5.6 g/l aluminum, i.e. 78% of the gallium extracted by substituted 8-hydroxyquinoline from the sodium aluminate solution but only 0.8% of the aluminum extracted with the gallium.

The invention thus provides a method of extracting gallium from a basic aqueous solution which requires a minimum of substituted hydroxyquinoline as well as a method which can be carried out in relatively small plants.

What is claimed is:

1. A method for liquid-liquid extraction of gallium from a basic aqueous solution, said method comprising the steps of
   contacting a sodium aluminate solution with an organic extractant containing a diluent and a substituted hydroxyquinoline to obtain a gallium and aluminum loaded organic extractant solution;
   thereafter bringing said loaded extractant solution into contact with concentrated aqueous mineral acid to strip gallium and aluminum from the extractant;
   separating an aqueous acidic solution of gallium and aluminum from the depleted extractant solution;
   then increasing the chloride content of the aqueous acidic solution of gallium and aluminum to a concentration of more than 2 mols per liter;
   contacting the aqueous solution with an organic solvent selected from the group consisting of ethyl ethers containing between 2 and 16 carbon atoms or alkyl acetates containing less than 10 carbon atoms to pass gallium chloride into the organic solvent while aluminum remains in the concentrated aqueous mineral acid;
   thereafter separating the aqueous acidic solution of aluminum from the gallium chloride loaded solvent, and
   then separating the organic solvent from the gallium chloride whereby the separated gallium chloride is available as a feed for producing pure gallium.

2. A method as set forth in claim 1 wherein said mineral acid is sulphuric acid.

3. A method as set forth in claim 1 wherein the chloride content is increased by adding a chloride salt to the aqueous acidic solution of gallium and aluminum.

4. A method as set forth in claim 3 wherein said chloride salt is an alkali metal chloride.

5. A method as set forth in claim 1 wherein the organic solvent is separated from the gallium chloride by evaporation thereof before the solvent is re-condensed.

6. A method as set forth in claim 1 wherein the gallium chloride is separated from the organic solvent by contacting the organic solvent loaded with gallium chloride with water to transfer the gallium chloride into the water and thereafter separating the organic solvent from the water.

7. A method as set forth in claim 1 wherein the organic solvent used for extracting gallium chloride is n-butyl acetate.

8. A method as set forth in claim 1 wherein the separated organic solvent is recycled to the acidic aqueous solution of gallium and aluminum.

9. A method as set forth in claim 1 wherein the gallium chloride is separated from the organic solvent by contacting the organic solvent loaded with gallium chloride with a dilute solution of a mineral acid to transfer the gallium chloride to the aqueous phase and thereafter separating the organic solvent from the aqueous phase.

10. A method as set forth in claim 1 wherein the chloride content is increased by adding hydrochloric acid to the aqueous acidic solution of gallium and aluminum.

* * * * *